United States Patent
Härle et al.

(10) Patent No.: US 6,258,151 B1
(45) Date of Patent: Jul. 10, 2001

(54) METHOD AND APPARATUS FOR THE PURIFICATION AND REUSE OF WASTE AIR MIXED WITH ADDITIVES (FOR EXAMPLE, SOLVENTS) OR IMPURITIES

(75) Inventors: Rainer Härle, Schwieberdingen; Gunter Thielen, Gütersloh, both of (DE)

(73) Assignee: Maul & Co. - CHR Belser GmbH, Nuremberg (DE)

( * ) Notice: Subject to any disclaimer, the term of this patent is extended or adjusted under 35 U.S.C. 154(b) by 0 days.

(21) Appl. No.: 09/242,813

(22) PCT Filed: Aug. 29, 1997

(86) PCT No.: PCT/DE97/01904

§ 371 Date: Apr. 28, 1999

§ 102(e) Date: Apr. 28, 1999

(87) PCT Pub. No.: WO98/08590

PCT Pub. Date: Mar. 5, 1998

(30) Foreign Application Priority Data

Aug. 30, 1996 (DE) .............................. 196 35 075

(51) Int. Cl.[7] .............................. B01D 5/00; B01D 50/00; B01D 51/10

(52) U.S. Cl. ............................... 95/1; 95/273; 95/287; 95/288; 55/315; 55/315.1; 55/338; 55/338.1; 55/467; 55/467.1

(58) Field of Search ....................... 55/315, 315.1, 55/315.2, 338, 338.1, 421, 467, 467.1; 95/1, 273, 288, 286, 287

(56) References Cited

U.S. PATENT DOCUMENTS 3,232,707 * 2/1966 Nebgen .................................. 95/288
4,662,899 5/1987 Tandon .
4,845,334 * 7/1989 Stocks et al. .......................... 55/338

FOREIGN PATENT DOCUMENTS

| | | |
|---|---|---|
| 25 45 161 | 4/1977 | (DE) . |
| 35 01 643 | 7/1986 | (DE) . |
| 36 44 807 | 7/1988 | (DE) . |
| 37 13 346 | 11/1988 | (DE) . |
| 39 07 437 | 7/1989 | (DE) . |
| 39 35 094 | 4/1991 | (DE) . |
| 44 10 973 | 3/1994 | (DE) . |
| 0 331 611 | 9/1989 | (EP) . |
| 2 085 310 | 4/1982 | (GB) . |
| 2110251 * | 6/1983 | (GB) .............................. 95/273 |
| 8-28845 * | 2/1996 | (JP) . |

OTHER PUBLICATIONS

International Search Report for PCT/DE97/01904.

* cited by examiner

Primary Examiner—David A. Simmons
Assistant Examiner—Robert A. Hopkins
(74) Attorney, Agent, or Firm—Merchant & Gould P.C.

(57) ABSTRACT

The present invention relates to methods and apparatuses for the purification and reuse of waste air mixed with additives (for example, solvents) or impurities, in particular for the purification and reuse of waste air mixed with solvents from dryer appliances of web-fed offset printing machines, in a first method step the waste air being led through at least one condenser in order to condense out additives or impurities contained in the waste air, in a second method step the waste air, treated according to the first method stop, being led through at least one separator element for the further purification of the waste air to remove condensed additives or impurities contained in it, and, finally, the waste air, treated according to the second method step, being recirculated for the renewed absorption or suction-removal of additives and impurities.

33 Claims, 2 Drawing Sheets

METHOD AND APPARATUS FOR THE PURIFICATION AND REUSE OF WASTE AIR MIXED WITH ADDITIVES (FOR EXAMPLE, SOLVENTS) OR IMPURITIES

BACKGROUND OF THE INVENTION

The invention relates to a method and an apparatus for the purification and reuse of waste air mixed with additives (for example, solvents) or impurities, and, in particular, to a method and an apparatus for the purification and reuse of waste air mixed with solvents from dryer appliances of web-fed offset printing machines.

For the purification of waste air, it is known, as the state of the art, to carry out thermal post-combustion of the waste air and thereby eliminate, by combustion at temperatures of 700–800° C., the additives and impurities contained in it. Post-combustion of this kind is energy consuming and produces undesirable additional substances (for example, $CO_2$, carbons).

The object on which the invention is based is to offer a method and an apparatus for the purification of waste air by the removal of additives or of impurities, in which energy-consuming post-combustion is dispensed with.

SUMMARY OF THE INVENTION

A first method variant according to the invention provides for leading the waste air through at least one condenser, in order to condense out additives and impurities contained in the waste air, and to lead the waste air through at least one separator element for the further purification of the waste air.

By virtue of the combination of the method steps of condensing out and separation, substantial or complete purification of the waste air, depending on the additives or impurities contained in it, is carried out, so that there is no longer any need for thermal post-combustion. If any extremely small fraction of additives (for example, solvents) or impurities still remains, it becomes possible, in a further method step of the method according to the invention, to recirculate the purified waste air and to reuse it for the renewed absorption or suction-removal of additives or impurities and, consequently, makes a renewed execution of the method possible.

Since there is no discharge of purified air into the surroundings, thermal post-combustion, which would result in basically complete purity of the waste air, irrespective of the additives and impurities, may be dispensed with. Any remaining slight residual constituents of additives and impurities are not discharged into the environment, but can be used once again for the execution of the method according co the invention.

The first method variant according to the invention makes it possible, by the combination of the method steps of condensing out and separation and by the recirculation of the waste air, purified in this way, within a closed circuit, to dispense with the energy-consuming thermal post-combustion which is necessary when ar open circuit, with the purified waste air being discharged into the environment, is used.

By virtue of the constant circulation of the repeatedly purified waste air, to which meterable quantities of fresh air may be added, it becomes possible to employ a condensing-out and separation purification technology which is more energy-effective and therefore more cost-effective than thermal post-combustion. At the same time, the requirements as to the purity and degree of purification of the waste air, which are required for the continuous and repeated execution of the method, and the requirements that the method according to the invention be environmentally friendly, are satisfied.

Before being introduced into the condenser, the laden waste air is advantageously guided through a fresh-air heat exchanger, so as to pass through a first cooling stage, in order, thereupon, to cause the additives and impurities to be condensed out in the following condenser.

Connecting in series two condensers, through which the waste air is led, brings about particularly thorough and complete condensing out. Such a series connection of two separator elements likewise increases the degree of purity of the waste air led through, after it has passed through the separator elements.

Concentration of the additives or impurities precipitated and separated in the condenser and separator element is advantageously carried out in a collector, so that condensed solvents converging there can be supplied again for their original purpose and serve for ink production.

In order further to increase the purifying capacity of the first method variant according to the invention, it is recommended to use, downstream of the condenser and separator element, a further filter element, through which the waste air is led.

Before the purified waste air is recirculated for the renewed absorption and suction-removal of additives and impurities, the already completely purified waste air is led through a conditioning apparatus, by means of which quantity metering, the admixture of fresh-air quantities required and the influencing of further air parameters (for example, temperature, humidity) can be carried out.

An advantageous multiple utilization of the first method variant according to the invention is achieved by driving a turbine by means of the waste air led through, the result of this being that current for driving individual assemblies of the purification system is generated in a generator connected to the turbine.

Furthermore, along the lines of combined power, heat and cold generation, the prevailing waste air and the waste air to be purified may be used for operating a cold generator and a heat generator, the thermal power of which may be used in each case, at the necessary location, for air cooling and air heating respectively.

The above-described possibilities for the multiple utilization of the waste air to be purified allow the cost-saving operation of the method as a whole, since at least a fraction of the electrical and thermal energy required for carrying out the method can be generated and made available, without having to resort to external energy sources.

The first apparatus variant according to the invention is distinguished by a completely closed pipe system, during the passage through which the waste air to be purified, after being led through a condenser, with subsequent condensing our, and after being led through a separator element, with further purification, is once again fed to the location where the waste air is extracted, and the purified waste air can be used for the reabsorption of additives and impurities By virtue of the closed circuit, no waste air at all is discharged into the environment, so that no account has to be taken of the relevant stringent purity requirements, which, according to the state of the art, have been achieved by thermal post-combustion in conjunction with an open circuit, and any remaining relatively small fractions of additives and impurities nevertheless allow the substantially purified waste air to be reused.

A second method variant according to the invention relates, in particular, to ink pastes which are used in web-fed offset printing and of which approximately 70% consists of pigments and approximately 30% of high-boiling mineral oils. Hitherto, after the drying operation in the dryer, these mineral oils have been released, suction-removed by the waste air and burnt with the aid of supporting gas at high temperatures of approximately 750° C., in order thereby to adhere to the prescribed content of residual carbons. Furthermore, benzenes released in the region of the printing units of the printing machines as a result of washings of the rubber blankets were also absorbed and discharged by means of the waste air.

The further method variant according to the invention, then, makes it possible to purify the waste air without thermal post-combustion. The waste air therefore no longer has to be heated to 750° C. and burnt with the aid of supporting gas, but has to be heated merely to a temperature of about 160° C.

By the use of indirectly heated dryers (that is to say, without an open flame), no oxygen is extracted from the purification air, so that pure circulating-air operation can be implemented, without the supply of fresh air, and, even in the machine enclosures used as a work area and in the surroundings of the printing machines, there is a sufficient quantity of air for the workers employed there.

Furthermore, in the second method variant according to the invention, the purified waste air fed into the machine enclosures; to the printing machines and dryers is conditioned by a conditioning apparatus in terms of the air parameters (for example, quantity, humidity and temperature), in such a way that the machine enclosures used as a work area have permissible maximum workplace concentration limit values (MAK limit values) and the process parameters necessary for the respective printing order are also set.

The second method variant thus makes it possible to have no-emission circulating-air operation and to utilize the work areas in the machine enclosures. Constant air-conditioning of the machine enclosures and the surroundings of the printing machines takes place.

Altogether, the second method variant makes it possible to circulate enormous quantities of waste air of at least 20,000 m$^3$/h, but, in particular, more than 30,000 m$^3$/h, and it therefore becomes possible, in circulating-air operation, both to have constant air-conditioning of the machine enclosures and to adhere to MAK limit values there and adhere to the process parameters necessary for the dryers.

Advantageously, the respective air parameters (for example, quantity, humidity and temperature) are interrogated via sensor/control sections in the machine enclosures, on the printing machines and dryers, and the conditioning apparatus is controlled/regulated accordingly, in order to implement the necessary Bet values.

Individually quantity metering of the purified waste-air quantities fed into the machine enclosures, dryers and respective printing-machine areas may be carried out via distributor elements.

Advantageously, the second method variant is operated by means of a system for combined power, heat and cold generation. Particularly due to the considerable circulated waste-air quantities described, a climatic system essentially independent of the seasonal outside conditions is formed in the circulating-air system and has a virtually constant heat and cold requirement, irrespective of the seasons, so that a combined power, heat and cold generation system of very high efficiency can be employed.

In particular, heating of the purified waste air in the machine enclosures and in the dryers can be carried out by means of the combined power, heat and cold generation.

Furthermore, a cold-water heat exchanger can be operated via the combined power, heat and cold generation.

By means of the second method variant, purification of the waste air to remove additives, in particular high-boiling mineral oils of the ink pastes used, of at most 10 mg/m$^3$ can be achieved.

By condensation, agglomeration, the use of special separators and activated charcoal, the separated mineral oils can be recovered completely again and reused for the renewed production of ink pastes. It has hitherto been possible only to recover low-grade oils, the quality of which was no longer sufficient for renewed ink production. the second apparatus variant according to the invention, which serves, in particular, for carrying out the second method variant, has, in addition to the apparatus features already known from Patent claim 10, at least one indirectly heated dryer and a conditioning apparatus for the personnel-specific arid process-specific setting of the purified waste air returned into the machine space, to the printing machines and dryers.

The second apparatus variant according to the invention may advantageously be designed individually by means of all the features of apparatus claims 11 to 22, so that the advantages described there are implemented.

Further details and advantages of the second apparatus variant are explained in more detail in the drawing figures.

Individual advantageous embodiments of the two apparatus variants according to the invention are explained more precisely, with reference to exemplary embodiments, in the drawing figures of which:

DETAILED DESCRIPTION OF THE INVENTION

Figure 1:
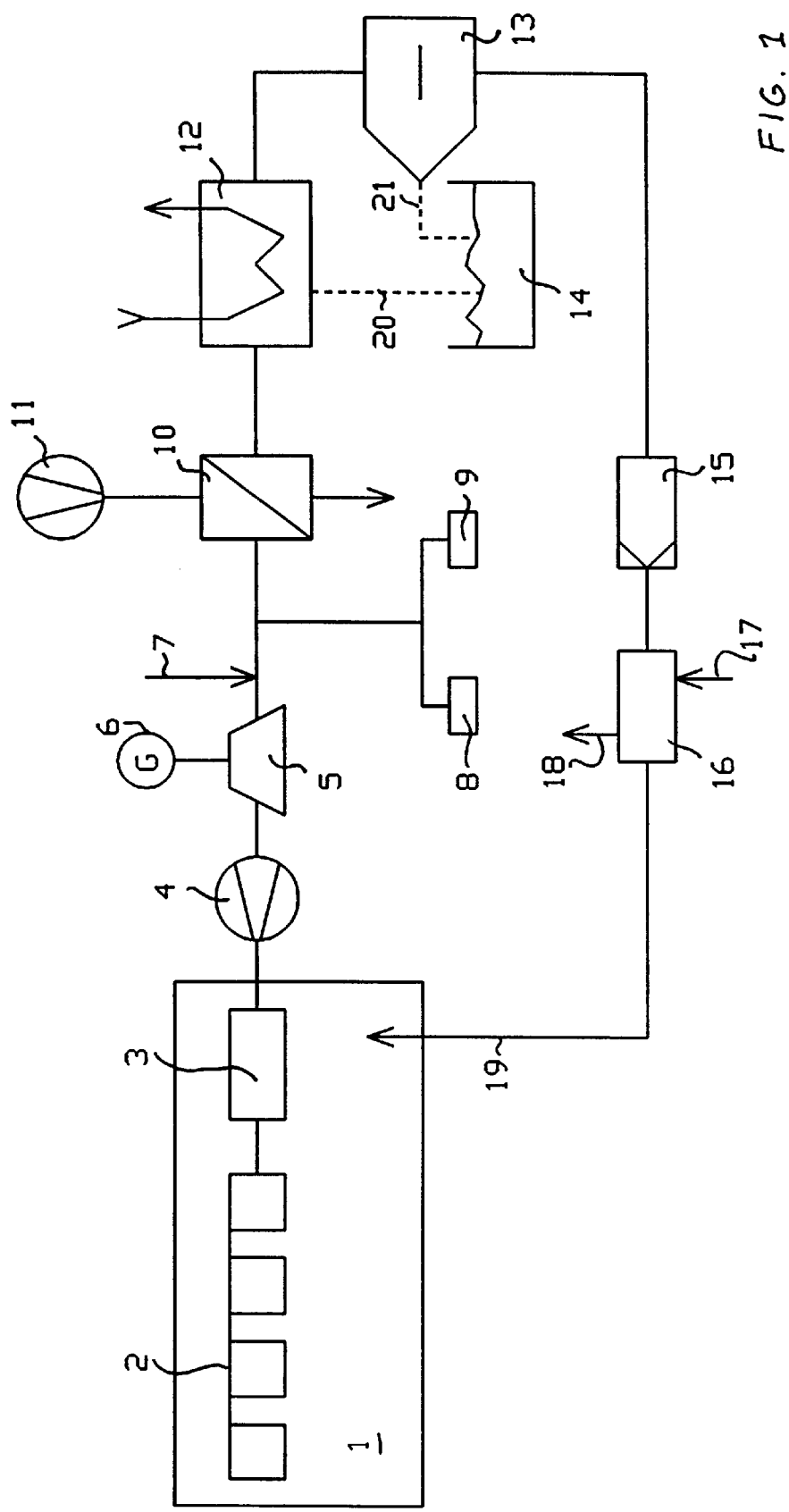
FIG. 1 shows a basic diagram of the first apparatus variant.

The apparatus shown in FIG. 1 illustrates the method and apparatus of the first variant by the example of waste-air purification and the reuse of waste air which is suction-removed from the dryer 3 of a printing machine 2 and which, after passing completely through the stations explained in more detail below, is led back again, in the purified state, into the machine space 1 via the return 19 and can be reused.

The turbine 5, connected to a generator 6, generates current for supplying the system assemblies. In a further multiple utilization of the prevailing waste air, the latter is used for operating a heat generator 8, in particular an absorption heat pump, and a cold generator 9, in particular an absorption refrigerating machine.

The thermal energy generated by the heat generator 8 and the cold generator 9 may, on the one hand, be used for the temperature control and hearing of the air before the latter is returned into the machine space 1 and, on the other hand, serve for cooling the condenser in the system circuit.

In order to compensate and keep constant the air quantity located in the system as a whole, a necessary air quantity is, if required, admixed with the laden waste air via the fresh-air supply 7 (substitute for spent oxygen in the dryer of the printing machine).

The laden waste air then enters, at a temperature of 100–180° C., the fresh-air heat exchanger which is operated via a blower 11 and which brings bout a first cooling of the laden waste air to about 70–50° C.

During the subsequent passage of the laden waste air through the condenser designed as a cold-water heat exchanger 12, a first condensing-out of the additives (for example, solvents) and impurities contained in the waste air takes place, the condensed additives, in particular the condensed solvent, being fed to a collector 14 via an outflow 20. The waste air, already partly purified in this way, leaves the cold-water heat exchanger 12 and passes through the separator element designed as a particle separator 13, whereupon, in further purification of the waste air, is the separated additives and, in particular, solvent particles are fed to the collector 14 once again via an outflow 21.

Figure 2:
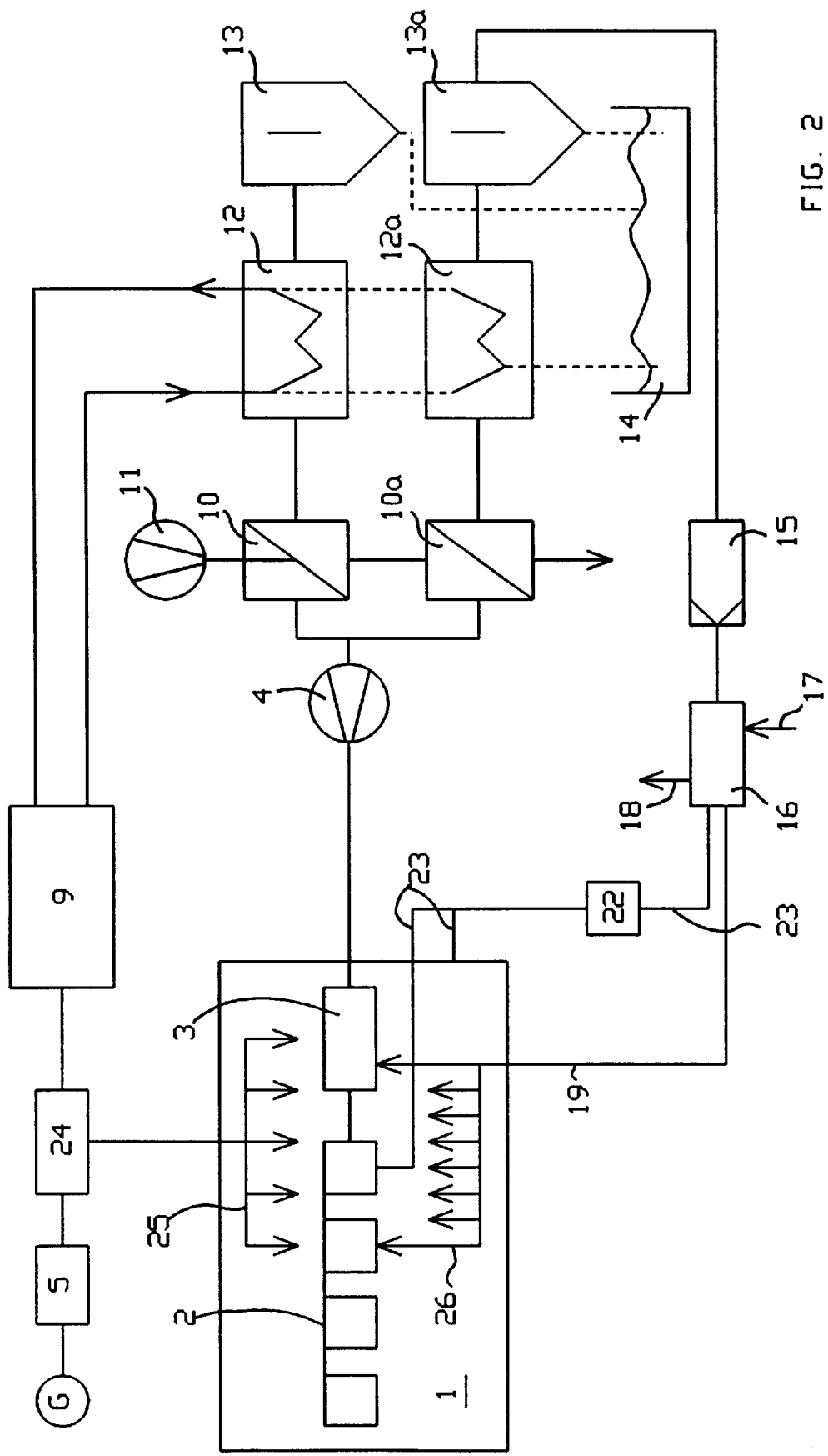
FIG. 2 shows a basic diagram of the second apparatus variant.

In the design variant shown in FIG. 2, a further fresh-air heat exchanger 10a, a cold-water heat exchanger 12a and a particle separator 13a are in each case connected in parallel to the fresh-air heat exchanger 10, the cold-water heat exchanger 12 and the particle separator 13, in such a way that, by means of change-over elements which are not illustrated in any more detail in the drawing figures, the waste-air stream can be guided either via the elements 10, 12, 13 or, alternatively to this, via the elements 10a, 12a and 13a. This is particularly advantageous, since it is then possible, during a work cycle of the elements 10, 12 and 13, to clean or regenerate the elements 10a, 12a and 13a in the usual way by heating, for example by the introduction of steam. The residues from the elements 10, 10a, 12, 12a and 13, 13a are fed jointly to the collector 14.

Advantageously, the collector 14 is designed as a solvent separator, so that any water quantities condensed out or separated from the cold-water heat exchanger 12 and/or the particle separator 13 can be isolated from the additionally condensed-out or separated solvent: particles and the pure solvent thus obtained can be employed for further use (for example, for ink production).

The waste air, already almost completely purified at the present stage, then passes, at a temperature of about 20–30° C., through the filter element 15 designed, for example, as an activated-charcoal filter, for further, particularly thorough purification to remove any remaining additives and impurities, in order, thereupon, to enter a conditioning apparatus 16 which serves for quantity metering, for the admixture of fresh air (via the fresh-air inlet 17 and air outlet 18) and for the freely selectable fixing of further air parameters (for example, temperature, humidity).

The waste air, which is purified in this way and the various air parameters of which are determined, is fed again to the machine space 1 as incoming air via the return 19 and, in a further passage through the system, can be sucked in again by the dryer 3 for the absorption of additives and impurities.

The closed system circuit, beginning with suction-removal from the dryer 3 and ending with the return 19, makes it possible to use waste air which is mixed with slight residual constituents of additives and impurities and which, if appropriate, is fed to the machine space 1 via the fresh-air inlet 17 or fresh air introduced by means of an air-conditioning system also present.

In addition to the apparatus components already described with reference to FIG. 1, the second apparatus variant according to FIG. 2 has a control/regulating device 22 which, via sensor/control sections 23, records the air parameters present in the machine space/machine enclosure 1 of the printing machine 2 and in the dryer 3 and, via control/regulation of the conditioning apparatus 16, adapts the air parameters (for example, quantity, humidity, temperature) of the purified waste air, fed via the return 19, to the maximum workplace concentration limit values (MAK limit values) permissible in the machine space/machine enclosure 1 and to the process parameters necessary for the respective printing order, and monitors adherence to these.

Via the distributor element 26, the purified waste air recirculated by means of the return 19 can be fed, quantity-metered individually, to the printing machine 2, the machine space/machine enclosure 1 (the terms "machine space" and "machine enclosure" are used synonymously) and the dryer 3.

A system of combined power, heat and cold generation by means of the system components, turbine 5 (for driving a generator 6), boiler 24 and cold generator 9, makes it possible to operate the plant according to FIG. 2 in a particularly efficient and energy-saving way.

Via the boiler 24, a quantity-metered delivery of steam for hearing the machine space 1, the printing machine 2 and the dryer 3 can be carried out via a distributor element 25.

The dryer 3 is indirectly heated (that is to say, without an open flame), so that no oxygen is extracted from the heated purified waste air. For indirect heating, the dryer 3 contains heat exchangers (for example, heat registers). Moreover, in the plant according to FIG. 2, a cold generator 9 is driven via the steam from the boiler 24 and, for example, can provide cold water for the cold-water heat exchanger 12.

What is claimed is:

1. Method for purification and reuse of waste air mixed with impurities, from dryers and machine enclosures of machines, comprising the method steps of:
    a) leading the waste air through at least one condenser adapted for condensing out the impurities in the waste air, and leading the waste air through at least one separator element adapted to remove condensed impurities in the waste air,
    b) conditioning air parameters of the waste air so as to adhere to predetermined limit values and predetermined process parameters,
    c) recirculating purified waste air for renewed removal of impurities,
    d) heating the purified waste air using dryers, without extracting oxygen from the purified waste air, and
    e) continuing the method beginning at method step a),
    wherein, via sensor/control sections, air parameters in the dryers, machine enclosures and machines are recorded, and corresponding conditioning of recirculated purified waste air is carried out in order to adhere to predetermined limit values and predetermined process parameters.

2. Method according to claim 1, further comprising the step of leading the waste air through a fresh-air heat exchanger before method step a).

3. Method according to claim 1, wherein in method step a) the waste air is led through two condensers, connected in series.

4. Method according to claim 1, wherein in method step b) the waste air is led through two separator elements connected in series.

5. Method according to claim 1, further comprising the step of leading the impurities to a collector.

6. Method according to claim 1, further comprising the step of leading the waste air through a filter element for further purification after method step b) and before method step c).

7. Method according to claim 1, further comprising the step of leading the waste air through a conditioning apparatus to perform at least one operation selected from the group consisting of quantity metering, the admixture of fresh air, temperature control, drying, and humidifying, after method step b).

8. Method according to claim 1, wherein a waste-air quantity of at least 20,000 m³/h is circulated.

9. Method according to claim 1, wherein current, heat and cold for operating the method are generated via combined power, heat and cold generation, and wherein heating of the purified waste air for the dryer and the machine enclosure is carried out via the combined power, heat and cold generation.

10. Method according to claim 9, wherein cold for operating the condenser is supplied by a cold-water heat exchanger operated via the combined power, heat and cold generation.

11. Method according to claim 1, wherein waste air recirculated into the dryer and the machine enclosure has a residual content of impurities of at most 10 mg/m³.

12. Apparatus for purification and reuse of waste air, comprising:
   a) a closed pipe system adapted for purifying and recirculating the waste air for renewed removal of impurities,
   b) at least one condenser, integrated into the pipe system, adapted for condensing out the impurities in the waste air,
   c) at least one separator element, contained in the pipe system, adapted for purifying the waste air to remove condensed impurities
   d) a turbine adapted to be driven by the waste air, and
   e) a generator engaged with the turbine,
   wherein the turbine is adapted for driving the generator, and the generator is adapted for generating current and for supplying current to the apparatus.

13. Apparatus according to claim 12, further comprising a fresh-air heat exchanger.

14. Apparatus according to claim 12, wherein the condenser comprises a cold-water heat exchanger.

15. Apparatus according to claim 12, wherein the separator element comprises a particle separator (13).

16. Apparatus according to claim 12, further comprising a collector adapted for receiving the impurities.

17. Apparatus according to claim 16, wherein the collector comprises a solvent separator adapted for separating a received mixture of water and solvent.

18. Apparatus according to claim 12, further comprising a filter element adapted for further purification of the waste air.

19. Apparatus according to claim 18, wherein the filter element comprises an activated-charcoal filter.

20. Apparatus according to claim 12, further comprising a conditioning apparatus adapted for at least one operation selected from the group consisting of quantity metering, the admixture of fresh air, temperature control, drying, and humidifying, the conditioning apparatus comprising a fresh-air inlet and an air outlet.

21. Apparatus according to claim 14, wherein the cold generator comprises an absorption refrigerating machine.

22. Apparatus according to claim 12, further comprising at least one dryer adapted for heating purified waste air without extracting oxygen from the waste air, wherein the dryer comprises heat exchangers.

23. Apparatus according to claim 22, further comprising a system adapted for combined power, heat and cold generation, the system comprising a turbine, a boiler and a cold generator, wherein the dryer is connected to the boiler of the system for combined power, heat and cold generation.

24. Method for purification and reuse of waste air, comprising the method steps of:
   a) leading the waste air through at least one condenser to condense out impurities in the waste air
   b) leading the waste air through at least one separator element to remove condensed impurities contained in the waste air,
   c) recirculating the waste air for renewed removal of impurities, and
   d) repeating the method beginning at method step a),
   wherein the waste air drives a turbine and a generator connected to the turbine, for current generation.

25. Method for purification and reuse of waste air, comprising the method steps of:
   a) leading the waste air through at least one condenser to condense out impurities in the waste air;
   b) leading the waste air through at least one separator element to remove condensed impurities contained in the waste air,
   c) recirculating the waste air for renewed removal of impurities, and
   d) repeating the method beginning at method step a),
   wherein the waste air drives at least one device selected from the group consisting of a cold generator and a heat generator.

26. Apparatus for purification and reuse of waste air, comprising:
   a) a closed pipe system adapted for purifying and recirculating the waste air for renewed removal of impurities,
   b) at least one condenser, integrated into the pipe system, adapted for condensing out the impurities in the waste air, the condenser comprising a cold-water heat exchanger,
   c) at least one separator element, contained in the pipe system, adapted for purifying the waste air to remove condensed impurities
   d) a cold generator adapted to be driven by the waste air, and adapted for cooling the cold-water heat exchanger.

27. Apparatus for purification and reuse of waste air, comprising:
   a) a closed pipe system adapted for purifying and recirculating the waste air for renewed removal of impurities,
   b) at least one condenser, integrated into the pipe system, adapted for condensing out the impurities in the waste air,
   c) at least one separator element, contained in the pipe system, adapted for purifying the waste air to remove condensed impurities,
   d) a heat generator adapted to be driven by the waste air, and adapted to control a temperature of purified waste air.

28. Method for purification and reuse of waste air mixed with impurities, from dryer appliances and machine enclosures of machines, comprising the method steps of:
   a) leading the waste air through at least one condenser adapted for condensing out the impurities in the waste air, and leading the waste air through at least one separator element adapted to remove condensed impurities in the waste air, b) conditioning air parameters of the waste air so as to adhere to predetermined limit values and predetermined process parameters, c) recirculating purified waste air for renewed removal of impurities, d) heating the purified waste air using dryers, without extracting oxygen from the purified waste air, and e) continuing the method beginning at method step a), wherein recirculated purified waste air is led, quantity-metered, partly to the machine enclosure, partly to the dryers and partly to the machines.

29. Method for purification and reuse of waste air mixed with impurities, from dryer appliances and machine enclosures of machines, comprising the method steps of:

a) leading the waste air through at least one condenser adapted for condensing out the impurities in the waste air, and leading the waste air through at least one separator element adapted to remove condensed impurities in the waste air, b) conditioning air parameters of the waste air so as to adhere to predetermined limit values and predetermined process parameters, c) recirculating purified waste air for renewed removal of impurities, d) heating the purified waste air using dryers, without extracting oxygen from the purified waste air, and e) continuing the method beginning at method step a), wherein current, heat and cold for operating the method are generated via combined power, heat and cold generation.

30. Apparatus for purification and reuse of waste air from dryers and machine enclosures of machines, comprising:

a) a closed pipe system adapted for purifying and recirculating the waste air for renewed removal of impurities, b) at least one condenser, integrated into the pipe system, adapted for condensing out the impurities in the waste air, and c) at least one separator element, contained in the pipe system, adapted for purifying the waste air to remove condensed impurities d) at least one dryer adapted for heating purified waste air without extracting oxygen from the waste air, e) a conditioning apparatus adapted for conditioning air parameters of the waste air so as to adhere to predetermined limit values and predetermined process parameters, and f) a control/regulating device adapted for controlling the conditioning apparatus.

31. Apparatus for purification and reuse of waste air from dryers and machine enclosures of machines, comprising:

a) a closed pipe system adapted for purifying and recirculating the waste air for renewed removal of impurities, b) at least one condenser, integrated into the pipe system, adapted for condensing out the impurities in the waste air, and c) at least one separator element, contained in the pipe system, adapted for purifying the waste air to remove condensed impurities d) at least one dryer adapted for heating purified waste air without extracting oxygen from the waste air, and e) a conditioning apparatus adapted for conditioning air parameters of the waste air so as to adhere to predetermined limit values and predetermined process parameters f) a system adapted for combined power, heat and cold generation, the system comprising a turbine, a boiler and a cold generator.

32. Apparatus for purification and reuse of waste air from dryers and machine enclosures of machines, comprising:

a) a closed pipe system adapted for purifying and recirculating the waste air for renewed removal of impurities, b) at least one condenser, integrated into the pipe system, adapted for condensing out the impurities in the waste air, and c) at least one separator element, contained in the pipe system, adapted for purifying the waste air to remove condensed impurities d) at least one dryer adapted for heating purified waste air without extracting oxygen from the waste air, and e) a conditioning apparatus adapted for conditioning air parameters of the waste air so as to adhere to predetermined limit values and predetermined process parameters f) a distributor element adapted to deliver steam for heating, quantity-metered, to the dryer, the machine enclosure and the machines.

33. Apparatus for purification and reuse of waste air from dryers and machine enclosures of machines, comprising:

a) a closed pipe system adapted for purifying and recirculating the waste air for renewed removal of impurities, b) at least one condenser, integrated into the pipe system, adapted for condensing out the impurities in the waste air, and c) at least one separator element, contained in the pipe system, adapted for purifying the waste air to remove condensed impurities d) at least one dryer adapted for heating purified waste air without extracting oxygen from the waste air, and e) a conditioning apparatus adapted for conditioning air parameters of the waste air so as to adhere to predetermined limit values and predetermined process parameters f) a distributor element adapted to deliver purified waste air, quantity-metered, to the dryer, the machine enclosure and the machines.

* * * * *